(12) United States Patent
Reich

(10) Patent No.: US 7,308,407 B2
(45) Date of Patent: Dec. 11, 2007

(54) METHOD AND SYSTEM FOR GENERATING NATURAL SOUNDING CONCATENATIVE SYNTHETIC SPEECH

(75) Inventor: David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 10/378,338

(22) Filed: Mar. 3, 2003

(65) Prior Publication Data

US 2004/0176957 A1 Sep. 9, 2004

(51) Int. Cl.
*G10L 19/14* (2006.01)

(52) U.S. Cl. .................................................. 704/266
(58) Field of Classification Search ................ 704/266
See application file for complete search history.

(56) References Cited

U.S. PATENT DOCUMENTS

| | | | |
|---|---|---|---|
| 5,204,905 A | | 4/1993 | Mitome |
| 5,806,021 A | * | 9/1998 | Chen et al. ..................... 704/9 |
| 5,911,129 A | * | 6/1999 | Towell ..................... 704/270.1 |
| 5,913,193 A | * | 6/1999 | Huang et al. ................ 704/258 |
| 5,970,453 A | * | 10/1999 | Sharman ..................... 704/260 |
| 6,003,005 A | | 12/1999 | Hirschberg |
| 6,081,780 A | * | 6/2000 | Lumelsky ................... 704/260 |
| 6,101,470 A | | 8/2000 | Eide et al. |
| 6,122,616 A | * | 9/2000 | Henton ........................ 704/258 |
| 6,163,769 A | * | 12/2000 | Acero et al. ................. 704/260 |
| 6,185,533 B1 | | 2/2001 | Holm et al. |
| 6,260,016 B1 | | 7/2001 | Holm et al. |
| 6,266,637 B1 | | 7/2001 | Donovan et al. |
| 6,308,156 B1 | * | 10/2001 | Barry et al. ................. 704/268 |
| 6,665,641 B1 | * | 12/2003 | Coorman et al. ........... 704/260 |
| 6,697,780 B1 | * | 2/2004 | Beutnagel et al. .......... 704/258 |
| 6,711,543 B2 | * | 3/2004 | Cameron ..................... 704/270 |
| 6,879,956 B1 | * | 4/2005 | Honda et al. ............... 704/244 |
| 7,076,430 B1 | * | 7/2006 | Cosatto et al. .............. 704/275 |

OTHER PUBLICATIONS

"IBM Concatenative Text-To-Speech: The Next Generation of Speech Synthesis Arrives", An IBM White Paper, IBM Corp., Oct. 25, 2001, pp. 1-8.

White, K., "Embedded ViaVoice", IBM Corp., Sep. 9, 2002, pp. 1-45.

* cited by examiner

*Primary Examiner*—Michael Opsasnick
(74) *Attorney, Agent, or Firm*—Akerman Senterfitt

(57) ABSTRACT

A method for generating synthetic speech can include identifying a recording of conversational speech and creating a transcription of the conversational speech. Using the transcription, rather than a predefined script, the recording can be analyzed and acoustic units extracted. Each acoustic unit can include a phoneme and/or a sub-phoneme. The acoustic units can be stored so that a concatenative text-to-speech engine can later splice the acoustic units together to produce synthetic speech.

19 Claims, 2 Drawing Sheets

METHOD AND SYSTEM FOR GENERATING NATURAL SOUNDING CONCATENATIVE SYNTHETIC SPEECH

BACKGROUND OF THE INVENTION

1. Technical Field

The present invention relates to the field of synthetic speech generation and, more particularly, to generating natural sounding speech.

2. Description of the Related Art

Synthetic speech generation is used in a multitude of situations, such as interactive voice response (IVR) applications, devices to aid specific handicaps, embedded computing systems, educational systems for automated teaching, children's electronic toys, and the like. In many of these situations customer acceptance and satisfaction of the generated speech is critical.

For example, IVR applications can be designed for customer convenience and to reduce business operating costs by reducing telephone related staffing requirements. In the event that customers are dissatisfied with the IVR system, individual customers will either opt out of the IVR system to speak with a human agent, will become generally disgruntled and factor their dissatisfaction into future purchasing decisions, or simply refuse to utilize the IVR system at all.

One reason many users dislike using systems that generate synthetic speech is that such speech can sound mechanical or unnatural and can be audibly unpleasant, even difficult to comprehend. The unnaturalness of synthetic speech results from flawed prosodic characteristics of the speech. Prosodic characteristics include the rhythmic aspects of language or the suprasegmental phonemes of pitch, stress, rhythm, juncture, nasalization, and voicing. Speech segments can include many discernable prosodic features such as audible changes in pitch, loudness, and syllable length.

One manner of generating synthetic speech, concatenative text-to-speech (TTS), joins discreet acoustic units together to form words. The acoustic units used in concatenative TTS are originally extracted from human speech. A variety of factors (such as how large the acoustic units are, how many units are stored, how units are represented, and what algorithms are used to select among units) contribute to the overall quality of generated synthetic speech. Relatively minor flaws and inaccuracies within acoustic units can result in large distortions within synthetic speech generated by concatenative TTS applications.

The speech samples used for generating acoustic units are derived from humans reading selected scripts. The content of scripts is varied and can include any type of material, such as excerpts from novels, newspapers, or magazines. The scripts can be accentuated heavily or read in a less dramatic, more professional manner. The selection of a linguistically clear and pleasant sounding speaker, the script utilized, and the manner of reading a script all substantially affect the acoustic units used for concatenative TTS generation. Despite numerous approaches undertaken and considerable research into improving prosodic characteristics of synthetically generated speech, conventional TTS generation still produces unnatural sounding speech which is generally disfavored by listeners.

SUMMARY OF THE INVENTION

The invention disclosed herein provides a method for generating acoustic units used by concatenative text-to-speech (TTS) systems. Acoustic units are extracted from a training corpus that includes stored speech recordings and associated transcriptions. The invention extracts acoustic units from a uniquely created training corpus. More particularly, the present invention records speech generated by human actors engaged in conversation. These recordings are then transcribed to text. Accordingly, the training corpus, in this case a collection of textual scripts and corresponding audio recordings, contains conversational speech instead of speech read from a script. Synthetic speech generated using the acoustic units extracted from conversational speech can sound more natural than synthetic speech generated using conventionally generated acoustic units, that is acoustic units derived from dictated speech. In one embodiment, prosodic information extracted from the conversational recordings also can be used when concatenating acoustic units.

The present invention recognizes a previously unnoticed flaw within the approach taken by conventional concatenative TTS systems. The acoustic data sets used within the training corpus of conventional TTS systems result from a speaker reading a script. Importantly, the dictated speech contains prosodic characteristics different from those prosodic characteristics existing within conversational speech. Because conventional TTS systems can be used to converse with human listeners and because the speech upon which concatenative TTS systems is based has been dictated, the resulting synthetic speech typically sounds unnatural.

This unnaturalness, however, is difficult to detect by examining individual acoustic units of a concatenative TTS system since each acoustic unit consists of phonemes or sub-phonemes. Researchers, recognizing the unnaturalness of synthetically generated speech have traditionally focused efforts upon improving the applied prosodic algorithms. It is generally believed that acoustic units used for concatenative TTS are so small that prosodic characteristics have been abstracted from the acoustic units. The inventors, however, have demonstrated that using conversational speech recordings to extract acoustic units can result in more natural sounding speech generation. It is believed, therefore, that imperfections exist within conventionally generated acoustic units that do not exist within acoustic units derived according to the present invention.

As defined herein, conversational speech, in contrast to speech read and dictated from a script, can refer to unscripted human speech generated in response to some form of stimulus, for example an audible stimulus. Conversational speech need not result from audible interactions between two humans, but can instead involve one speaker and one prompting apparatus. Moreover, the duration and content of conversational speech for purposes of the invention are not material, and no minimal contextual requirements exist. Only the acoustic characteristics of the conversational speech are relevant for the invention defined herein.

One aspect of the present invention can include a method for generating synthetic speech including identifying a recording of conversational speech. For example, identifying the recording can first involve receiving conversational speech generated by a speaker and recording at least a portion of the conversational speech as the recording. In one embodiment, the conversational speech can be received after an acoustic environment has been established. The speaker can be disposed within the acoustic environment.

Notably, the signal-to-noise ratio of recorded conversational speech to other ambient noise in the acoustic environment can be at least 10 decibels. Alternatively, the signal-to-noise ratio can be at least 30 decibels. Still, those skilled in the art will recognize that any suitable signal-to-noise ratio is acceptable as long as the recording is of suitable quality to derive acoustic units for use by a concatenative TTS system and/or engine. Accordingly, the speaker can be prompted to produce free form speech. For example, the prompting can occur by establishing a conversation between the speaker and a second speaker. In another example, artificially generated speech or a prompting apparatus can be used to prompt the speaker for the conversational speech.

Once a recording has been identified, acoustic units can be identified within the recording. Each acoustic unit can include a phoneme and/or a sub-phoneme. The acoustic units can be extracted from the recording and can be stored. The stored acoustic units can be concatenated to one another by a text-to-speech engine to form synthetic speech.

In one embodiment, prosodic information can be determined from the recording and stored so that the prosodic information can be used by the text-to-speech engine when concatenating the acoustic units to form synthetic speech. In another embodiment, a textual transcription can be generated from the recording. The textual transcription can be utilized in extracting the acoustic units and in determining the prosodic information. Synthetic speech can be generated by concatenating the acoustic units.

Another aspect of the present invention can include a system for synthetically generating speech. The system can include a training corpus having at least one conversational speech recording and at least one associated transcription. Further, an acoustic unit store can be included that can be configured to store a plurality of acoustic units. At least a portion of the acoustic units can be generated from data contained within the training corpus and can be derived from the conversational speech recording.

The system also can include a concatenative text-to-speech engine configured to utilize the acoustic unit store to synthetically generate speech. In one embodiment, the concatenative text-to-speech engine can utilize prosodic information extracted from the training corpus to synthetically generate speech. In another embodiment, an acoustic environment can be included within which conversational speech is recorded. The signal-to-noise ratio of the recorded conversational speech to other ambient noise recorded in the acoustic environment can be at least 10 decibels.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method of generating synthetic speech. More particularly, conversational recordings can be taken of human speech occurring within an acoustically favorable environment. The conversational recordings can then be transcribed. At least a portion of the conversational recordings and the associated transcriptions can be used as a training corpus from which acoustic units, consisting of phoneme and/or sub-phoneme units, can be extracted. These acoustic units, derived from the conversational recordings, can be used by a concatenative text-to-speech (TTS) system to generate synthetic speech. In one embodiment, prosodic information extracted from the conversational recordings can be used to construct algorithms that concatenate acoustic units to form speech.

Figure 1:
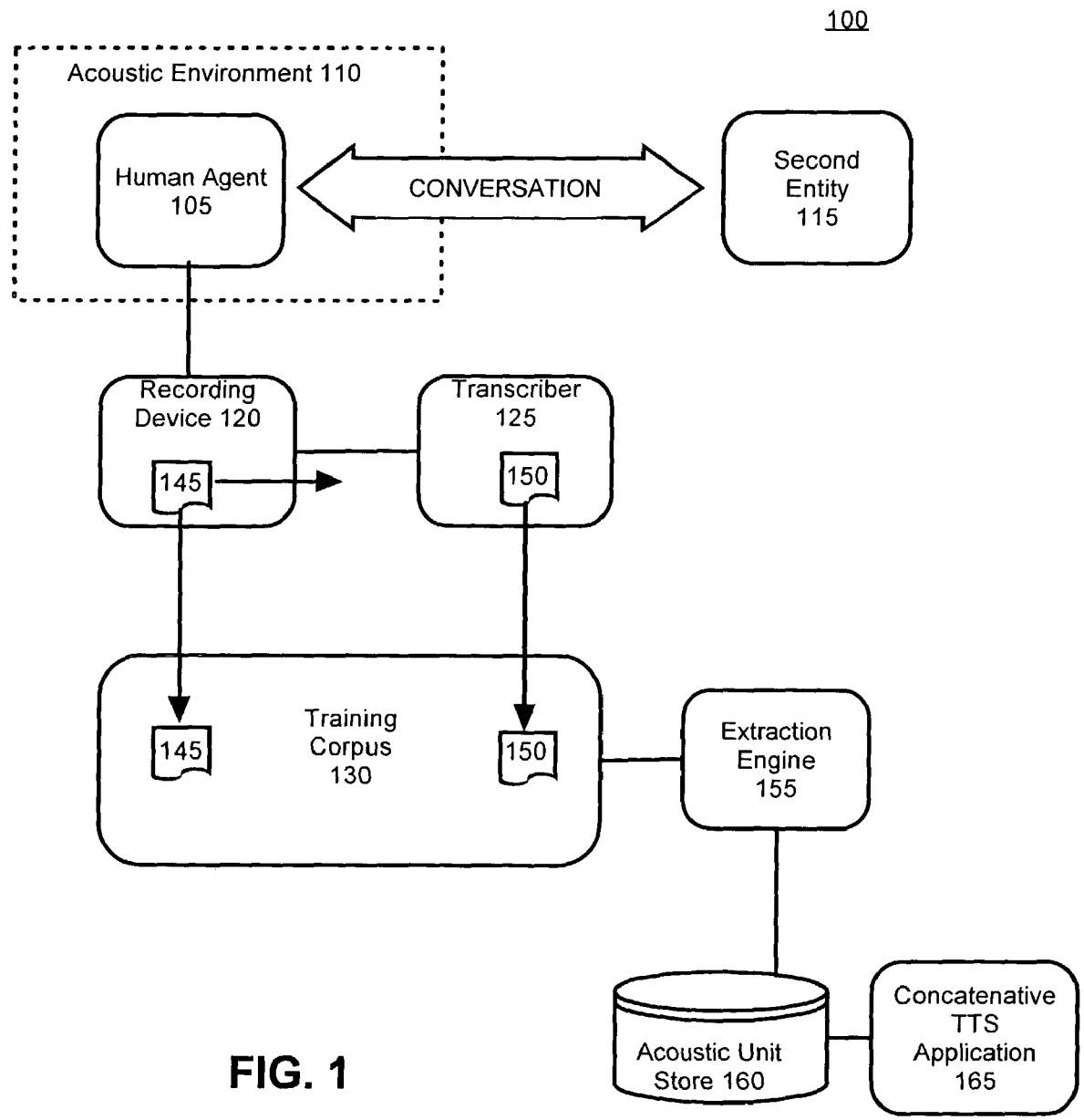
FIG. 1 is a schematic diagram illustrating an exemplary system for creating concatenative synthetic speech in accordance with the inventive arrangements disclosed herein.

FIG. 1 is a schematic diagram illustrating an exemplary system 100 for creating concatenative synthetic speech in accordance with the inventive arrangements disclosed herein. System 100 can include an acoustic environment 110, a second entity 115, a transcriber 125, and a training corpus 130. The acoustic environment 110 can be an environment, such as a sound studio, fashioned to produce high quality audio recordings with a minimal amount of ambient noise. For example, recording of speech made within the acoustic environment can have a signal-to-noise ratio (SNR) greater than 10 decibels. Notably, higher levels of ambient noise within the acoustic environment can cause lower SNR's and result in a speech sample 145 which is insufficiently clear to produce accurate acoustic units for concatenative TTS. Acoustic environments 110 wherein a recording having a SNR higher than 10 decibels, for example on the order of 30 decibels, also can be used and are preferred. Still, any acoustic environment wherein a recording of speech can be made which is suitable for deriving acoustic units for use with a concatenative TTS system and/or engine can be used.

The second entity 115 can be any entity capable of conversing with a speaker 105. The second entity 115 can be a second human either present within the acoustic environment 110 or disposed outside the acoustic environment yet communicatively linked to it. The second entity 115 can also be a non-human prompting apparatus. For example, the second entity 115 can be a computing device capable of generating synthetic speech. Additionally, a second entity 115 can be a tape-playing device that audibly plays prerecorded tapes to the speaker 105 to simulate a conversation. The second entity 115 can also be a display, a paper, or other apparatus containing questions to which the speaker 105 can respond in the form of free form speech. The second entity 115 can, in fact, be any entity or device capable of audibly prompting the speaker 105 so that the speech produced in response by the speaker 105 is conversational speech, in terms of the acoustic characteristics of the speech.

The transcriber 125 can be any device or agent capable of converting a speech sample 145 into a text sample 150. For example, the transcriber 125 can be a person listening to the speech sample and responsively typing a transcript or can be a computing device with speech-to-text functionality. The training corpus 130 can be a data store containing the speech and text samples from which acoustic units used by a concatenative TTS application 165 are extracted. For example, the training corpus 130 can be a magnetic or optical storage space containing files including speech samples 145 and associated text samples 150.

In operation, a speaker 105 can be selected to produce a speech sample 145. The speaker 105 can be placed within the acoustic environment 110. When in the acoustic environment, a second entity 115 can engage the speaker 105 in conversation. Portions of the speech of the speaker 105 can be stored by a recording device 120, such as a tape recorder. The recorded speech can form a speech sample 145, which can be conveyed to the transcriber 125. The transcriber can then generate a text sample 150 of the speech or a textual representation of the speech. Both the speech sample 145 of conversational speech and the text sample 150 can be stored in the training corpus 130. The speech sample 145 and the text sample 150 can be synchronized with one another or time aligned such that the text 150 can be paired with the audio from which that text was recognized.

An extraction engine 155 can use the samples stored within the training corpus 130 to generate acoustic units and store the acoustic units within an acoustic unit store 160. Although prosodic information from conventional sources of dictated text can be used, the extraction engine 155 also can extract prosodic information from the speech sample 145 and the text sample 150. This prosodic information can be used to construct algorithms which couple the acoustic units together to form speech. More particularly, the prosodic information can be used as parameters within existing algorithms which govern the manner in which the acoustic units are played to generate speech. The prosodic information can govern characteristics such as syllable stress, timing, and rhythm of speech. This acoustic unit store 160 can be used by a concatenative TTS application 165 to produce synthetic speech.

Figure 2:
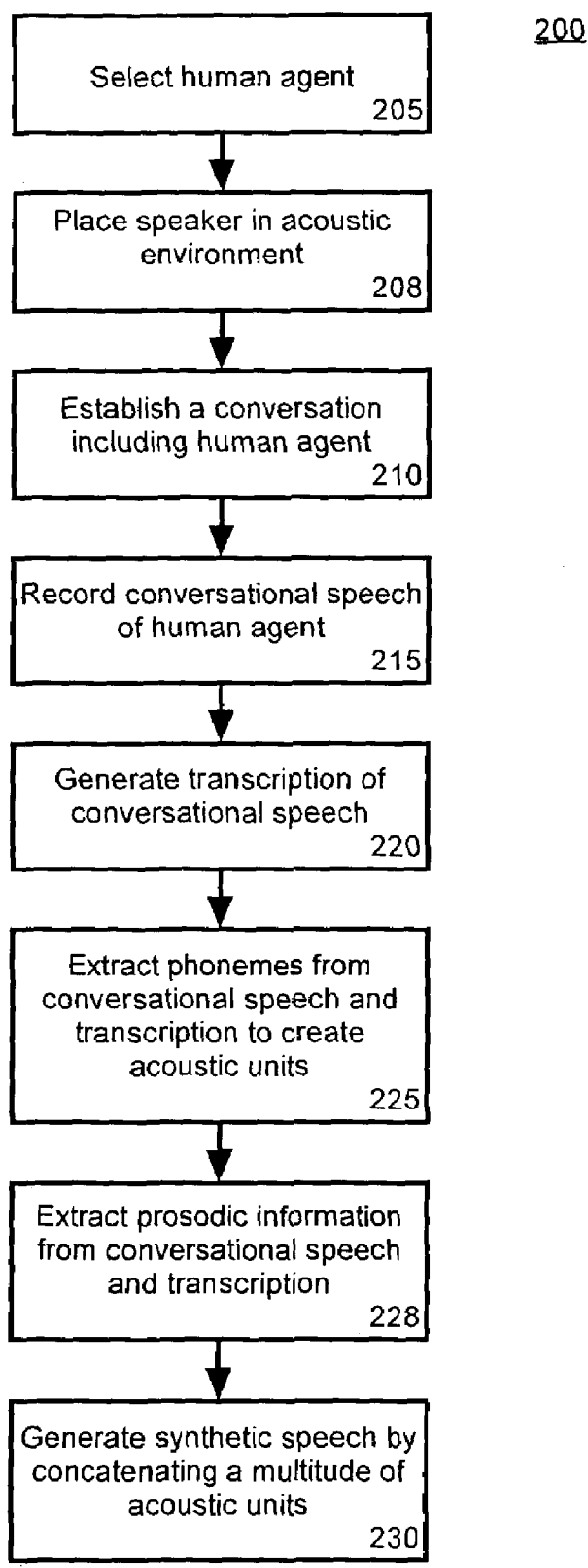
FIG. 2 is a flow chart illustrating an exemplary method of generating samples from which acoustic units are extracted using the system of FIG. 1.

FIG. 2 is a flow chart illustrating an exemplary method 200 of generating samples from which acoustic units are extracted using the system of FIG. 1. The method 200 can be performed wherever a human speech sample and text sample is needed to produce acoustic units used for generating synthetic speech. The method can begin in step 205 where a speaker is selected. Although any selection can be made, the speaker will typically be selected based upon vocal qualities.

In step 208, the selected speaker can be placed within an acoustic environment. Optimally, a soundproof environment wherein a high SNR can be achieved and one having quality input devices for recording speech will be selected. Occasionally, however, it may not be feasible to select an acoustically optimal environment. In such a situation, the highest quality acoustic environment available should be selected. For example, a selected speaker can be unavailable, unwilling, or too expensive to procure and place within an optimal audio environment. Thus, in one embodiment, an existing sound recording which contains conversational speech can be used. In another embodiment, speech samples can be taken via telephone or through another convenient environment with favorable, but not optimal, audio characteristics.

In step 210, a conversation can be established with the speaker. Since the purpose behind the conversation is to create the acoustic characteristics of conversational speech, as opposed to the acoustic characteristics existing within speech derived from reading a script, the level of conversation need not be high. In one embodiment, in fact, the "conversation" can consist of a recording providing conversation stimulating queues, such as "tell me more" or "I understand, continue" whenever the speaker pauses for a predefined duration. In another embodiment, a computing device with some embedded artificial intelligence can produce synthetic speech to engage the speaker in conversation. In yet another embodiment, the speaker can read questions from a prompter and audibly respond using free form speech. Any conversational speech involving at least one speaker can be used in this step.

In step 215, a recording of the speech of the speaker can be made. The recording can contain a speaker's speech during a single conversation or can contain samples extracted from multiple conversations. In step 220, a transcription can be generated of the recorded conversational speech. This transcription can be produced manually or automatically. In step 225, phonemes and sub-phonemes can be extracted from the recorded conversational speech to produce acoustic units. Any manner of processing can be used at this stage so long as the speech sample from which acoustic units are extracted contains conversational speech.

In step 228, prosodic information can be extracted from the conversational speech and textual transcript. In step 230, a concatenative TTS application can use the generated acoustic units to create synthetic speech. The prosodic information extracted within step 228 can also be used in the synthetic speech generation process. By using acoustic units generated from conversational speech and by joining the acoustic units with algorithms containing prosodic information based upon conversational speech, more natural-sounding, synthetically-generated speech can result.

It should be noted that while in one embodiment, the conversational speech sample within the training corpus has been specifically generated in order to produce acoustic units, the invention is not so limited. Any situation where acoustic units are determined from free form speech is contemplated within this invention. For example, an audible sample from a recording of an actor conversing with a talk show host can be used as a conversational speech sample for purposes of the invention. In another example, existing recordings of historical persons engaged in conversations can be used as a source of speech samples from which acoustic units can be generated for use with concatenative TTS systems.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for generating synthetic speech comprising the steps of;
   presenting a stimulus to a human speaker;
   prompting the human speaker to respond with conversational speech in response to the stimulus;
   capturing a recording of the conversational speech spoken by the human speaker;
   identifying a plurality of acoustic units from said recording, wherein each said acoustic unit includes at least one of a phoneme and a sub-phoneme;
   extracting said acoustic units from said recording; and, storing said acoustic units for use by a concatenative text-to-speech engine to generate synthetic speech, wherein the synthetic speech comprises one or more acoustic units spoken by the human speaker.

2. The method of claim 1, further comprising the step of: generating synthetic speech using said concatenative ten-to-speech engine using said acoustic units.

3. The method of claim 1, further comprising the steps of: determining prosodic information from said recording; and,
storing said prosodic information so that said prosodic information can be used by said text-to-speech engine when concatenating said acoustic units to form synthetic speech.

4. The method of claim 3, further comprising the steps of: generating a textual transcription from said recording, wherein said textual transcription is utilized in extracting said acoustic units, and wherein said textual transcription is utilized in determining said prosodic information.

5. The method of claim 1, wherein said identifying step further comprises the steps of:
receiving conversational speech generated by a human speaker; and,
recording at least a portion of said conversational speech as said recording.

6. The method of claim 5, wherein said receiving step further comprises the steps of:
establishing an acoustic environment;
positioning said human speaker within said acoustic environment, wherein the signal-to-noise ratio of said recorded conversational speech to other ambient noise recorded in said acoustic environment is at least 10 decibels; and,
prompting said human speaker to produce free form speech.

7. The method of claim 6, wherein said prompting step further comprises the step of:
establishing a conversation between said human speaker and a second human speaker.

8. The method of claim 6, wherein said prompting step further comprises prompting said human speaker using a prompting apparatus.

9. The method of claim 6, wherein said signal-to-noise ratio is at least 30 decibels.

10. A system for synthetically generating speech comprising:
a training corpus containing at least one conversational speech recording that is captured by presenting a stimulus to a human speaker and prompting the human speaker to respond with conversational speech in response to the stimulus, and at least one associated transcription;
an acoustic unit store configured to store a plurality of acoustic units spoken by the human speaker, wherein at least a portion of said acoustic units are generated from data contained within said training corpus, and wherein at least a portion of said acoustic units are derived from said conversational speech recording;
a concatenative text-to-speech engine configured to utilize said acoustic unit store to synthetically generate speech, wherein said concatenative text-to-speech engine utilizes prosodic information extracted from said training corpus to synthetically generate speech; and
an acoustic environment within which conversational speech is recorded, wherein the signal-to-noise ratio of said recorded conversational speech to other ambient noise recorded in said acoustic environment is at least 10 decibels.

11. A machine-readable storage having stored thereon, a computer program having
a plurality of code sections, said code sections executable by a machine for causing the machine to perform the steps of:
presenting a stimulus to a human speaker;
prompting the human speaker to respond with conversational speech in response to the stimulus;
capturing a recording of the conversational speech spoken by the human speaker;
identifying a plurality of acoustic units from said recording, wherein each said acoustic unit includes at least one of a phoneme and a sub-phoneme;
extracting said acoustic units from said recording; and,
storing said acoustic units for use by a concatenative ten-to-speech engine to generate synthetic speech, wherein the synthetic speech comprises one or more acoustic units spoken by the human speaker.

12. The machine-readable storage of claim 11, further comprising the step of:
generating synthetic speech using said concatenative text-to-speech engine using said acoustic units.

13. The machine-readable storage of claim 11, further comprising the steps of:
determining prosodic information from said recording; and,
storing said prosodic information so that said prosodic information can be used by said text-to-speech engine when concatenating said acoustic units to form synthetic speech.

14. The machine-readable storage of claim 13, further comprising the steps of:
generating a textual transcription from said recording, wherein said textual transcription is utilized in extracting said acoustic units, and wherein said textual transcription is utilized in determining said prosodic information.

15. The machine-readable storage of claim 11, wherein said identifying step further comprises the steps of:
receiving conversational speech generated by a human speaker; and,
recording at least a portion of said conversational speech as said recording.

16. The machine-readable storage of claim 15, wherein said receiving step further comprises the steps of:
establishing an acoustic environment;
disposing said human speaker within said acoustic environment, wherein the signal-to-noise ratio of said recorded conversational speech to other ambient noise recorded in said acoustic environment is at least 10 decibels; and,
prompting said human speaker to produce free form speech.

17. The machine-readable storage of claim 16, wherein said prompting step further comprises the step of:
establishing a conversation between said human speaker and a second human speaker.

18. The machine-readable storage of claim 16, wherein said prompting step further comprises prompting said human speaker using a prompting apparatus.

19. The machine-readable storage of claim 16, wherein said signal-to-noise ratio is at least 30 decibels.

* * * * *